US012749206B1

(12) United States Patent
Zeng et al.

(10) Patent No.: US 12,749,206 B1
(45) Date of Patent: Sep. 29, 2026

(54) DEPTH VALUE DETERMINATION BASED ON FACE INDICES

(71) Applicant: Apple Inc., Cupertino, CA (US)

(72) Inventors: Zhixiang Zeng, Sunnyvale, CA (US); Ying Bai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 18/894,315

(22) Filed: Sep. 24, 2024

Related U.S. Application Data

(60) Provisional application No. 63/541,178, filed on Sep. 28, 2023.

(51) Int. Cl.

| | |
|---|---|
| ***G06K 9/00*** | (2022.01) |
| ***G06T 3/4007*** | (2024.01) |
| ***G06T 7/50*** | (2017.01) |
| ***G06T 7/80*** | (2017.01) |

(52) U.S. Cl.
CPC .............. *G06T 7/50* (2017.01); *G06T 3/4007* (2013.01); *G06T 7/80* (2017.01); *G06T 2207/10028* (2013.01); *G06T 2207/30201* (2013.01)

(58) Field of Classification Search
CPC ........... G06T 7/50; G06T 3/4007; G06T 7/80; G06T 2207/10028; G06T 2207/30201
See application file for complete search history.

(56) References Cited

U.S. PATENT DOCUMENTS

| | | | | |
|---|---|---|---|---|
| 2019/0114832 | A1* | 4/2019 | Park | G06T 7/579 |
| 2019/0362511 | A1* | 11/2019 | Jouppi | G01B 11/22 |
| 2021/0350560 | A1 | 11/2021 | Laidlow et al. | |
| 2022/0051372 | A1 | 2/2022 | Toft et al. | |
| 2023/0232110 | A1* | 7/2023 | Limonov | H04N 23/698 |
| 2023/0245373 | A1 | 8/2023 | Xiong et al. | |
| 2023/0274455 | A1 | 8/2023 | Price et al. | |

FOREIGN PATENT DOCUMENTS

| | | | | |
|---|---|---|---|---|
| CN | 106709947 A | * | 5/2017 | |
| CN | 109118579 A | * | 1/2019 | G06T 7/50 |

* cited by examiner

*Primary Examiner* — Xin Jia
(74) *Attorney, Agent, or Firm* — Fernando & Partners, LLP

(57) ABSTRACT

In one implementation, a method of determining a depth value for a pixel of an image of a physical environment using a face-index map, wherein the face-index map includes a plurality of face-index map elements that includes a list of faces of a projection of a 3D polygon mesh of the physical environment in respective areas of the image.

20 Claims, 4 Drawing Sheets

DEPTH VALUE DETERMINATION BASED ON FACE INDICES

CROSS-REFERENCE TO RELATED APPLICATIONS

This application claims priority to U.S. Provisional Patent App. No. 63/541,178, filed on Sep. 28, 2023, which is hereby incorporated by reference in its entirety.

TECHNICAL FIELD

The present disclosure generally relates to determining depth values for an image of a physical environment.

BACKGROUND

In various implementations, it may be useful to associate a depth value with a pixel of an image of a physical environment, wherein the depth value represents the distance to the object in the physical environment represented by the pixel. For example, when reprojecting an image from a first perspective to a second perspective, the depth value of pixels may be used.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
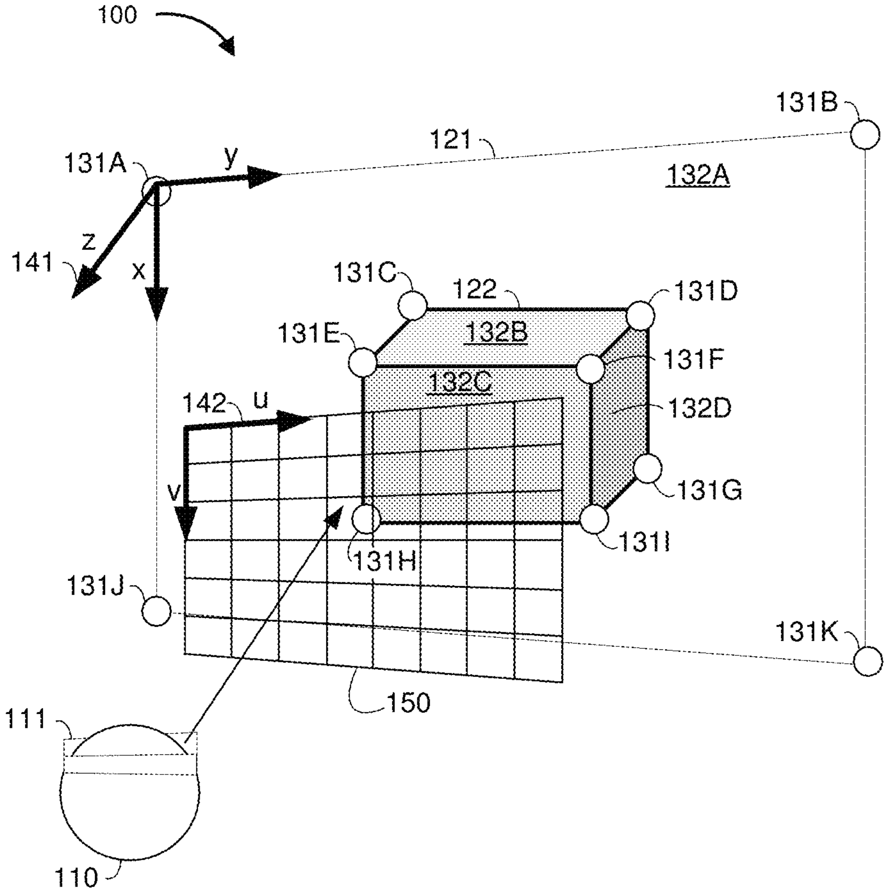
FIG. 1A illustrates a perspective view of a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for determining a depth value for a pixel. In various implementations, a method is performed at a device including an image sensor, one or more processors, and non-transitory memory. The method includes capturing, using the image sensor, an image of a physical environment. The method includes obtaining a depth map for the image of the physical environment, wherein the depth map includes a plurality of depth map elements respectively associated with a plurality of areas of the image and each of the plurality of depth map elements includes a depth value representing a distance between the image sensor and a point in the physical environment represented by the respective area of the image. The method includes obtaining a face-index map for the image of the physical environment, wherein the face-index map includes a plurality of face-index map elements respectively associated with the plurality of the areas of the image and each of the plurality of face-index map elements includes a list of faces of a projection of a 3D polygon mesh of the physical environment in the respective area of the image. The method includes determining a number of distinct face indices of the face-index map elements corresponding to a subset of the plurality of the areas of the image nearest a pixel of the image. The method includes in response to determining that the number of distinct face indices is one, determining a depth value for the pixel via interpolation of depth values of depth map elements corresponding to the subset of the plurality of areas of the image nearest the pixel. The method includes in response to determining that the number of distinct face indices is two or more, determining the depth value for the pixel as a distance between the image sensor and a point of the 3D polygon mesh corresponding to the pixel.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, in various implementations, it may be useful to determine a depth value associated with a pixel of image of a physical environment. In various implementations, a depth value is determined by ray tracing from the location of an image sensor that captured the image to a 3D polygon mesh of the physical environment. However, ray tracing for each pixel of the image may be computationally expensive. Thus, in various implementations, ray tracing is performed for a subset of the pixels of the image and depth values for pixels between the pixels of the subset are determined using interpolation.

However, in various implementations, interpolation can provide inaccurate or erroneous results. For example, for a pixel representing a location near the edge of an object, the interpolation is a weighting of a similar depth value of a pixel representing a location on the object and a very different depth value of a pixel representing a location off of the object. Accordingly, in various implementations, when the pixel represents a location that is not at the edge of an object, interpolation of ray traced depth values is performed and when the pixel represents a location near the edge of an object, additional ray tracing is performed. Thus, the accuracy of ray tracing for each pixel of the image is achieved with less computation than performing ray tracing for each pixel of the image.

FIG. 1A illustrates a perspective view of a physical environment 100 in accordance with some implementations. The physical environment 100 is associated with a three-dimensional coordinate system (represented by axes 141) such that locations in the physical environment 100 may be defined by a set of three-dimensional coordinates in the three-dimensional coordinate system. The physical environment 100 includes a box 122 in front of a wall 121. The physical environment 100 further includes a user 110 wearing a head-mounted device 111.

The head-mounted device 111 includes an image sensor and a display. The image sensor captured images of the physical environment 100 and the display displays processed versions of the images of the physical environment 100. In various implementations, the images of the physical environment 100 presented to the user 110 on the display may not always reflect what the user would see if the head-mounted device 111 were not present due to the different positions of the eyes of the user 110, the display, and the image sensor in space. Thus, in various implementations, the images of the physical environment 100 are transformed such that they appear to have been captured at a location closer to the location of the user's eyes using depth values. Each depth value represents, for a pixel of an image of the physical environment 100, the distance from the location of the image sensor to the point in the physical environment 100 represented by the pixel.

In various implementations, to determine a depth value, ray tracing is performed. The image sensor is associated with an image plane 150 in the three-dimensional coordinate system defined by the intrinsic parameters and the extrinsic parameters of the image sensor. It is to be appreciated that, although the image plane 150 is visualized in FIG. 1A, the image plane 150 is not a physical object in the physical environment 100.

The image plane 150 is associated with a two-dimensional coordinate system (represented by axes 142) such that locations in the image plane 150 may be defined by a set of two-dimensional coordinates in the two-dimensional coordinate system. The two-dimensional coordinate system and three-dimensional coordinate system are related via a coordinate system transform that changes based on the location of the image plane 150 in the physical environment 100. Each pixel of an image of the physical environment 100 is associated with a location in the image plane 150. The location in the image plane can be represented by a set of two-dimensional coordinates in the two-dimensional coordinate system or, via the coordinate system transform, a set of three-dimensional coordinates in the three-dimensional coordinate system. Further, each pixel of an image of the physical environment 100 is associated with a ray originating from the location of the image sensor and passing through the location in the image plane.

The depth value for a pixel of an image of the physical environment 100 is the distance between the location of the image sensor and the intersection of the ray with the physical environment 100. In various implementations, to determine this distance, a 3D polygonal mesh representing the physical environment 100 is used. In various implementations, the 3D polygonal mesh includes a plurality of vertices 131A-131K and a plurality of faces 132A-132D between sets of the plurality of vertices 131A-131K. It is to be appreciated that, although the 3D polygonal mesh is visualized in FIG. 1A as a representation of objects in the physical environment, the 3D polygonal mesh is not itself a physical object in the physical environment 100.

Each of the plurality of vertices 131A-131K is associated with a set of three-dimensional coordinates in the three-dimensional coordinate system defining the location of the vertex in the physical environment 100. Each of the plurality of faces 132A-132D is associated with a unique face index and a coplanar set of the plurality of vertices 131A-131K defining the shape of the face. In various implementations, each of the plurality of faces 132A-132D is associated with three vertices. In FIG. 1A, each of the plurality of faces 132A-132D is associated with four vertices. For example, a first face 132A with a face index of "A" and corresponding the wall 121 is associated with vertex 131A, vertex 131B, vertex 131J, and vertex 131K. A second face 132B with a face index of "B" and corresponding to the top of the box 122 is associated with vertex 131C, vertex 131D, vertex 131E, and vertex 131F. A third face 133C with a face index of "C" and corresponding to the front of the box 122 is associated with vertex 131E, vertex 131F, vertex 131H, and vertex 131I. A fourth face 133D with a face index of "D" and corresponding to the side of the box 122 is associated with vertex 131D, vertex 131F, vertex 131G, and vertex 131I. Each of the plurality of faces 132A-132D lies in a plane in the three-dimensional coordinate system and defines a segment of the plane encompassed by edges connecting the vertices.

Figure 1B:
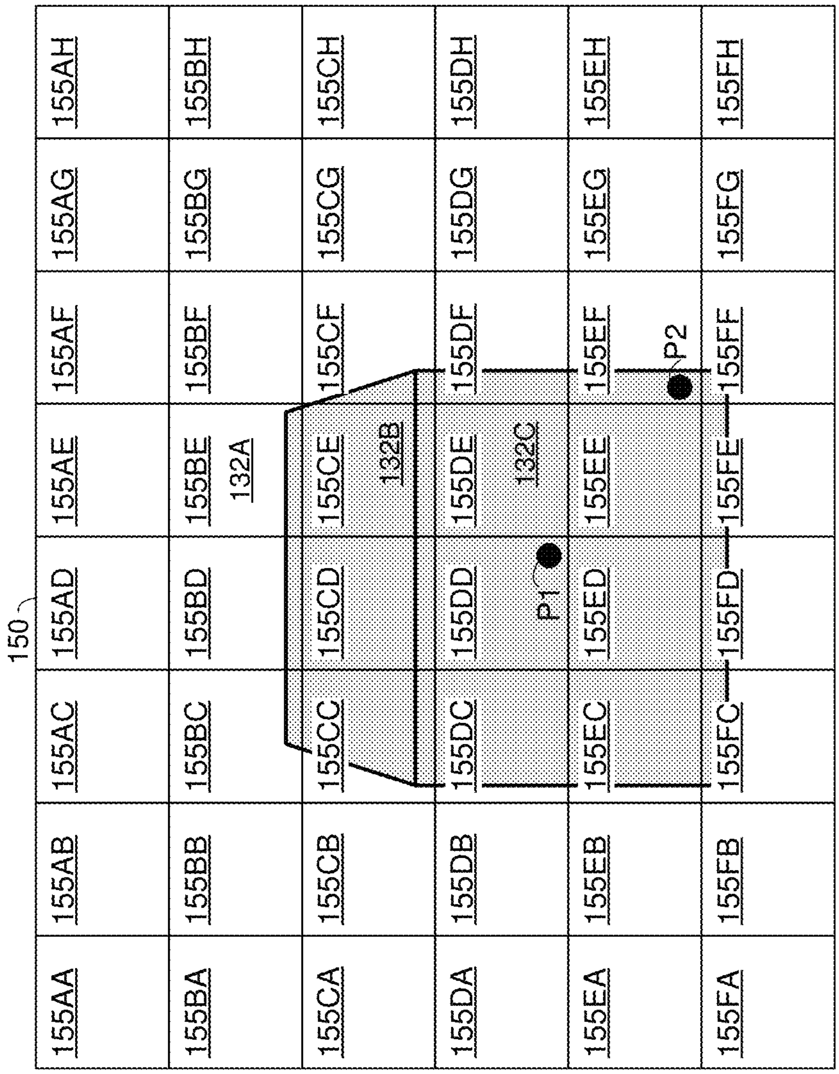
FIG. 1B illustrates a front view of the image plane of the physical environment of FIG. 1A.

FIG. 1B illustrates a front view of the image plane 150. Whereas an image of the physical environment 100 is a matrix of M×N pixels, each associated with a pixel value (e.g., a grayscale value or a color triplet), the image plane 150 can be separated into an M/m×N/n matrix of tiles 155AA-155FH. Each of the matrix of tiles 155AA-155FH represents an area of the image plane 150 corresponding to an m×n pixel area of the image of the physical environment 100.

In various implementations, the head-mounted device 111 generates an M/m×N/n depth map, wherein each element of the depth map corresponds to one of the matrix of tiles 155AA-155FH and is associated with a depth value. In various implementations, the depth value is determined via ray tracing, e.g., determining the length of a line segment originating at the location of the image sensor, passing through the corresponding tile of the matrix of tiles 155AA-155FH (e.g., through the center of the corresponding tile), and ending at the 3D polygonal mesh.

For example, the depth value for the element of the depth map corresponding to tile 155EB (which corresponds to a portion of the wall 121) is approximately 50. As another example, the depth value for the element of the depth map corresponding to tile 155DD (which corresponds to a portion of the front of the box 122) is approximately 10. As another example, the depth value for the element of the depth map corresponding to tile 155EF (which corresponds to both a portion of the wall 121 and a portion of the front of the box 122) is approximately 50 because the center point of the tile 155EF corresponds to a point on wall 121.

In various implementations, the head-mounted device 111 generates an M/m×N/n face-index map, wherein each element of face-index map corresponds to one of the matrix of tiles 155AA-155FH and is associated with a face-index list. The face-index list includes the face index for each face within the corresponding tile of the matrix of tiles 155AA-155FG. For example, the face-index list includes the face index for each face that could be intersected by a ray originating from the location of the image sensor and passing through the corresponding tile. As another example, the face-index list includes the face index for each face in the corresponding tile of a projection of the 3D polygonal mesh onto the image plane 150. In various implementations, the projection of the 3D polygonal mesh onto the image plane is performed using the intrinsic parameters and the extrinsic parameters of the image sensor.

For example, the face-index list for the element of the face-index map corresponding to tile 155EB (which corresponds to a portion of the wall 121) is {"A"}. As another example, the face-index list for the element of the face-index map corresponding to tile 155DD (which corresponds to a portion of the front of the box 122) is {"C"}. As another example, the face-index list for the element of the face-index map corresponding to tile 155EF (which corresponds to both a portion of the wall 121 and a portion of the front of the box 122) is {"A", "C"}. As another example, the face-index list for the element of the face-index map corresponding to tile 155CF is {"A", "B", "C"}.

To determine the depth value for a pixel, the face-index list for each of a set of tiles is combined into a combined face-index list. If the number of distinct face indices in the combined face-index list is one, the depth value for the pixel is determined by interpolating the depth values of the elements of the depth map corresponding to the set of tiles. If the number of distinct face indices in the combined face-index list is greater than one, the depth value for the pixel is determined via ray tracing.

In various implementations, the set of tiles includes a single tile including the pixel. If the tile includes only a single face index, the depth value for the pixel is the depth value of the element of the depth map corresponding to the tile. In various implementations, the set of tiles includes the tile including the pixel and one or more neighboring tiles nearest the pixel. The neighboring tiles nearest the pixel are the tiles that include center points nearest the pixel. For example, to perform planar interpolation, the set of tiles includes the tile including the pixel and the two neighboring tiles nearest the pixel. As another example, to perform bilinear interpolation, the set of tiles includes the tile including the pixel and the three neighboring tiles nearest the pixel.

In various implementations, planar interpolation and bilinear interpolation provide more accurate results than using only the depth value of the element of the depth map corresponding to the tile. For example, for a pixel in tile 155CD, in which the second face 132B is not at an approximately constant depth (e.g., not parallel to the XY-plane), interpolation can account for this change in depth across the tile. In particular, a pixel in tile 155CD near its top edge has a greater depth value than a pixel in the center of tile 155CD having the depth value of the element of the depth map corresponding to the tile.

Because the depth value of the element of depth map corresponding to the set of tiles is determined to lie on the same plane (e.g., of the face corresponding to the single face index), performing interpolation of a higher order than planar interpolation or bilinear interpolation provides lesser benefit, but may be beneficial if the depth map is noisy.

For example, to determine the depth value for a pixel at a point P1 in the image plane 150 within tile 155DD, a set of tiles nearest the point P1 are determined. For the point P1, the three nearest tiles are tile 155DD, tile 155DE, and tile 155ED.

Next, the face-index list for each of the set of tiles is combined into a combined face-index list. For the three nearest tiles, as the face-index list for each of tile 155DD, tile 155DE, and tile 155ED is {"C"}, the combined face-index list is {"C", "C", "C"}.

Next, the number of distinct face indices in the combined face-index list is determined. For the three nearest tiles, although the combined face-index list includes three face indices, the combined face-index list only includes one distinct face index (e.g., "C") associated with one distinct face (e.g., face 132C). Because the combined face-index list only includes one distinct face index, the depth value for the pixel at the point P1 is determined by performing interpolation on the depth values of the elements of the depth map corresponding to the set of tiles nearest the point P1. For example, the depth values of the elements of the sparse depth map corresponding to tile 155DD, tile 155DE, and tile 155E are each approximately 10. Thus, the depth value for the pixel at the point P1 is approximately 10.

In various implementations, the combined face-index list is generated by iteratively adding the face-index list of each of the set of tiles. For example, at a first iteration, the combined face-index list is initially the face-index list for tile 155DD (e.g., {"C"}). At a second iteration, the combined face-index list is the face index list of tile 155DD and tile 155DE (e.g., {"C", "C"}). At a third iteration, the combined face-index list is the face index list of tile 155DD, tile 155DE, and tile 155ED (e.g., {"C", "C", "C"}). If at any iteration, the number of distinct face indices is greater than one, the depth value for the pixel is determined via ray tracing.

As another example, to determine the depth value for a pixel at a point P2 in the image plane 150 within tile 155EF, a set of tiles nearest the point P2 are determined. For the point P2, the three nearest tiles are tile 155EF, tile 155EE, and tile 155FF.

Next, the face-index list for each of the set of tiles is combined into a combined face-index list. For the three nearest tiles, as the face-index list for tile 155EF is {"A", "C"} the face-index list for tile 155EE is {"C"}, and the face-index list for tile 155FF is {"A"}, the combined face-index list is {"A", "C", "C", "A"}.

Next, the number of distinct face indices in the combined face-index list is determined. For the three nearest tiles, although the combined face-index list includes four face indices, the combined face-index list only includes two distinct face indices (e.g., "A" and "C") associated with two distinct faces (e.g., face 132A and face 132C). Because the combined face-index list includes two or more distinct face indices, the depth value for the pixel at the point P2 is not determined by performing interpolation on the depth values of the elements of the depth map corresponding to the three tiles nearest the point P2. For example, if the depth value for the pixel at the point P2 were determined using interpolation, because the depth value of the element of the sparse depth map corresponding to tile 155EF is approximately 50, the depth value of the element of the sparse depth map corresponding to tile 155EE is approximately 10, and the depth value of the element of the sparse depth map corresponding to tile 155FF is approximately 50, the depth value for the pixel at the point P2 determined using interpolation is approximately 35.

Instead, because the combined-face index list includes two or more distinct face indices, to determine the depth value for the pixel at the point P2, the head-mounted device 111 determines which face of the two or more distinct faces is associated with the point P2. In particular, the head-mounted device 111 determines which face is intersected by a ray projected from the location of the image sensor through the point P2.

For example, in various implementations, the head-mounted device 111 sequentially determines whether the ray intersects each of the two or more distinct faces and stops when an intersection is found. For example, for the point P2, the head-mounted device 111 decides to determine whether the ray intersects face 132A and determines that the ray does not intersect face 132A. Because the head-mounted device determines that the ray does not intersect face 132A, the head-mounted device 111 decides to determine whether the ray intersects face 132C and determines that the ray does intersect face 132C. Because the head-mounted device 111 determines that the ray interests face 132C, the head-mounted device 111 decides not to determine whether the ray intersects any other faces.

Having determined that the ray intersects face 132C, the head-mounted device 111 determines the depth value for the pixel at point P2 using ray tracing, e.g., determining the length of a line segment originating at the location of the image sensor, passing through the point P2, and ending at the face 132C. Thus, the head-mounted device 111 determines the depth value for the pixel at P2 is approximately 10 (rather than approximately 35 as might be determined using interpolation).

In various implementations, the combined face-index list is generated by iteratively adding the face-index list of each of the set of tiles. For example, at a first iteration, the combined face-index list is initially the face-index list for tile 155EF (e.g., {"A", "C"}). At a second iteration, the combined face-index list is the face index list of tile 155EF and tile 155EE (e.g., {"A", "C", "C"}). At a third iteration, the combined face-index list is the face index list of tile 155EF, tile 155EE, and tile 155FF (e.g., {"A", "C", "C", "A"}). If at any iteration, the number of distinct face indices is greater than one, the depth value for the pixel is determined via ray tracing. Thus, for the pixel at point P2, the depth value for the pixel is determined via ray tracing after the first iteration, based only on the face-index list for tile 155EF.

Thus, the depth value for each pixel in tile 155EF (and for each pixel in any tile having a face-index list with two or more face indices) is determined via ray tracing, thereby identifying the edges between face 132A and 132C. As noted above, ray tracing is computationally expensive. Thus, to conserve power and computing resources, when the pixel represents a location that is not near the edges between faces, interpolation of ray traced depth values is performed and when the pixel represents a location near the edges between faces, additional ray tracing is performed. Thus, the accuracy of ray tracing for each pixel of the image is achieved with less computation than performing ray tracing for each pixel of the image.

Figure 2:
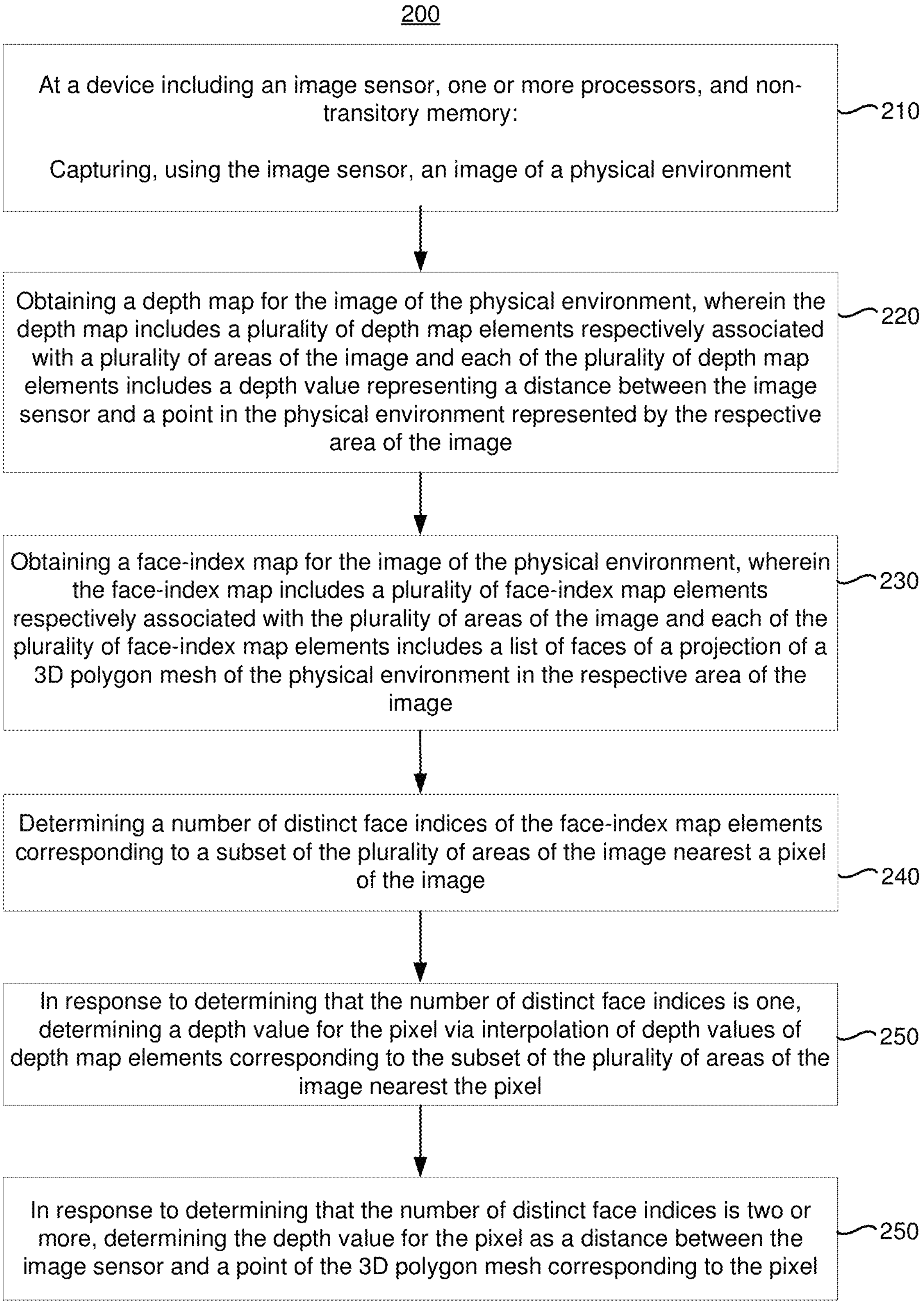
FIG. 2 is a flowchart representation of a method of determining a depth value for a pixel of an image of a physical environment in accordance with some implementations.

FIG. 2 is a flowchart representation of a method 200 of determining a depth value for a pixel of an image of a physical environment in accordance with some implementations. In various implementations, the method 200 is performed by a device including an image sensor, one or more processors, and non-transitory memory. In some implementations, the method 200 is performed by processing logic, including hardware, firmware, software, or a combination thereof. In some implementations, the method 200 is performed by a processor executing instructions (e.g., code) stored in a non-transitory computer-readable medium (e.g., a memory).

The method 200 begins, in block 210, with the device capturing, an image of a physical environment. In various implementations, the image is a matrix of M×N pixels, each associated with a pixel value (e.g., a grayscale value or a color triplet).

The method 200 continues, in block 220, with the device obtaining a depth map for the image of the physical environment. In various implementations, the depth map includes a plurality of depth map elements respectively associated with a plurality of areas of image. For example, in various implementations, each area is m×n pixels and the depth map is a matrix of M/m×N/n elements. In various implementations, each of the plurality of depth map elements includes a depth value representing a distance between the image sensor and a point in the physical environment represented by the respective area of the image, e.g., the point in the physical environment represented by the center of the respective area of the image.

The method 200 continues, in block 230, with the device obtaining a face-index map for the image of the physical environment. In various implementations, the face-index map includes a plurality of face-index map elements respectively associated with the plurality of areas of the image. Thus, in various implementations, the face-index map and the depth map have the same resolution (e.g., the face-index map and the depth map are each a matrix of M/m×N/n elements) which is less than the resolution of the image. For example, in various implementations, the image has a first resolution, the depth map has a second resolution less than the first resolution, and the face-index map has the second resolution.

In various implementations, each of the plurality of face-index map elements includes a list of faces of a projection of a 3D polygon mesh of the physical environment in the respective area of the image. In various implementations, the 3D polygon mesh includes a plurality of vertices respectively associated with a plurality of sets of three-dimensional coordinates in a three-dimensional coordinate system of the physical environment and a plurality of faces respectively associated with a plurality of sets of the plurality of vertices. In various implementations, each set of the plurality of vertices has three vertices. In various implementations, at least one set of the plurality of vertices has four or more vertices. In various implementations, the projection of the 3D polygon mesh is a projection onto an image plane of the image. For example, in various implementations, the projection of the 3D polygon mesh is based on intrinsic parameters and/or extrinsic parameters of the image sensor. In various implementations, the 3D polygon mesh is generated from data from one or more sensors, such as a camera, an inertial measurement unit, a LIDAR sensor, etc. For example, in various implementations, vertices of the 3D polygon mesh are determined using stereo image matching or a depth sensor. Thus, each face of the 3D polygon mesh represents a portion of a surface of an object in the physical environment.

In various implementations, the device generates the face-index map without generating the projection of the 3D polygon mesh. For example, in various implementations, the device uses a modified renderer which generates for each of M×N elements, instead of a pixel value (e.g., a grayscale value or a color triplet), a face value indicative of the face index of the face of the element. The device generates the face-index map by generating a list of each distinct face index within each area of the image.

The method 200 continues, in block 240, with the device determining a number of distinct face indices of the face-index map elements corresponding to a subset of the plurality of the areas of the image nearest a pixel of the image. In various implementations, the subset of the plurality of the areas of the image nearest the pixel has three areas of the image. In various implementations, the subset of the plurality of the areas of the image nearest the pixel has four areas of the image.

In various implementations, the device generates a combined face-index list including the face indices of the face-index map elements corresponding to the subset of the plurality of the areas of the image and determines the number of distinct face indices in the combined face-index list.

The method 200 continues, in block 250, with the device, in response to determining that the number of distinct face indices is one, determining a depth value for the pixel via interpolation of depth values of depth map elements corresponding to the subset of the plurality of the areas of the image nearest the pixel. In various implementations, determining the depth value includes performing planar interpolation between three depth values. In various implementations, determining the depth value includes performing bilinear interpolation between four depth values. Because the pixel and the depth map elements each correspond to the same plane in the physical world, the depth value for the pixel represents an accurate estimation of the distance to the object in the physical world represented by the pixel.

The method 200 continues, in block 260, with the device, in response to determining that the number of distinct face indices is two or more, determining the depth value for the pixel as a distance between the image sensor and a point of the 3D polygon mesh corresponding to the pixel. For example, in various implementations, the distance between the image sensor and the point of the 3D polygon mesh corresponding to the pixel is the length of a line segment between the location of the image sensor and the 3D polygon mesh passing through a point on the image plane corresponding to the pixel.

Thus, in response to determining that the number of distinct face indices is two or more, the device determines the depth value for the pixel using ray tracing on the 3D polygon mesh. Because the face of the 3D polygon mesh represents a portion of a surface of an object in the physical world, the depth value for the pixel represents an accurate estimation of the distance to the object in the physical world represented by the pixel. In various implementations, the device similarly generates the depth map using ray tracing on the 3D polygon mesh. For example, in various implementations, each of the plurality of depth map elements includes a depth value representing a distance between the image sensor and a point on the 3D polygon mesh passing through the respective area of the image (e.g., through the center of the respective area of the image).

In various implementations, the device determines the distance between the image sensor and the point of the 3D polygon mesh corresponding to the pixel by determining which face of the 3D polygon mesh corresponds to the pixel. For example, in various implementations, the device determines whether a ray passing from the origin through the point on the image plane intersects a first face corresponding to a first face index of the two or more distinct indices. In response to determining that the ray intersects the first face at an intersection point, the device determines the distance between the origin and the intersection point. In response to determining that the ray does not intersect the first face, the device determines whether a ray passing from the origin through the point on the image plane intersects a second face corresponding to a second face index of the two or more distinct indices. Thus, the device sequentially determines whether a ray intersects a face corresponding to the two or more distinct indices and stops when a ray intersects.

In various implementations, the device uses the depth of the pixel (and, in various implementations, other depths of other pixels found in similar manner) to perform perspective correction. Thus, in various implementations, the method 200 further includes transforming the image from a first perspective of the image sensor to a second perspective based on the depth value for the pixel and displaying the transformed image. In various implementations, the second perspective is a perspective of an eye of a user. In various implementations, the second perspective is closer to the eye of the user than the first perspective in one or more dimensions of a device coordinate system.

Figure 3:
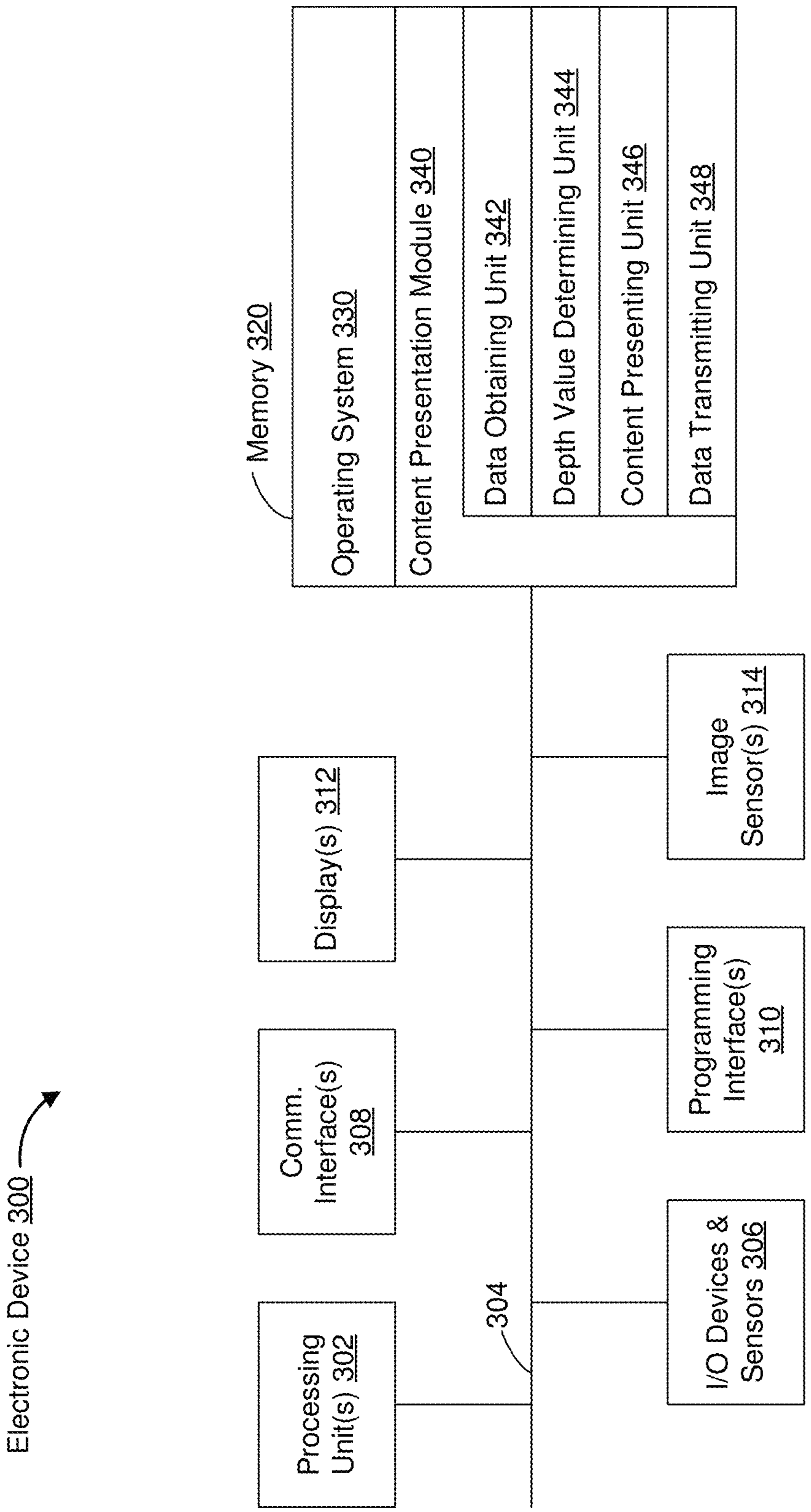
FIG. 3 is a block diagram of an example of an electronic device in accordance with some implementations.

FIG. 3 is a block diagram of an example of an electronic device 300 in accordance with some implementations. In various implementations, the electronic device corresponds to the head-mounted device 111 of FIG. 1A. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 300 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more microphones, one or more speakers, one or more biometric sensors (e.g., blood pressure monitor, heart rate monitor, breathing monitor, electrodermal monitor, blood oxygen sensor, blood glucose sensor, etc.), a haptics engine, one or more depth sensors (e.g., a structured light, a time-of-flight, or the like), and/or the like.

In some implementations, the one or more displays 312 are configured to display processed images of a physical environment. In some implementations, the one or more displays 312 includes holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 corresponds to diffractive, reflective, polarized, holographic, etc. waveguide displays. In various implementations, the one or more displays 312 are capable of presenting mixed reality and/or virtual reality content.

In various implementations, the one or more images sensors 314 include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a content presentation module 340.

The operating system 330 includes procedures for handling various basic system services and for performing hardware dependent tasks. In some implementations, the content presentation module 340 is configured to present content to the user via the one or more displays 314. To that end, in various implementations, the content presentation module 340 includes a data obtaining unit 342, a depth value determining unit 344, a content presenting unit 346, and a data transmitting unit 348.

In some implementations, the data obtaining unit 342 is configured to obtain data (e.g., presentation data, interaction data, sensor data, location data, etc.) from other components of the electronic device 300. To that end, in various implementations, the data obtaining unit 342 includes instructions and/or logic therefor, and heuristics and metadata therefor.

In some implementations, the depth value determining unit 344 is configured to determine a depth value for a pixel of an image of a physical environment. To that end, in various implementations, the depth value determining unit 344 includes instructions and/or logic therefor, and heuristics and metadata therefor.

In some implementations, the content presenting unit 346 is configured to present content via the one or more displays 312, e.g., a version of the image of the physical environment processed according the depth value. To that end, in various implementations, the content presenting unit 346 includes instructions and/or logic therefor, and heuristics and metadata therefor.

In some implementations, the data transmitting unit 348 is configured to transmit data (e.g., presentation data, location data, etc.) to other components of the electronic device 300. To that end, in various implementations, the data transmitting unit 348 includes instructions and/or logic therefor, and heuristics and metadata therefor.

Although the data obtaining unit 342, the depth value determining unit 344, the content presenting unit 346, and the data transmitting unit 348 are shown as residing on a single device (e.g., the electronic device 300), it should be understood that in other implementations, any combination of the data obtaining unit 342, the depth value determining unit 344, the content presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device including an image sensor, one or more processors, and non-transitory memory:

capturing, using the image sensor, an image of a physical environment;

obtaining a depth map for the image of the physical environment, wherein the depth map includes a plurality of depth map elements respectively associated with a plurality of areas of the image and each of the plurality of depth map elements includes a depth value representing a distance between the image sensor and a point in the physical environment represented by the respective area of the image;

obtaining a face-index map for the image of the physical environment, wherein the face-index map includes a plurality of face-index map elements respectively associated with the plurality of the areas of the image and each of the plurality of face-index map elements includes a list of faces of a projection of a 3D polygon mesh of the physical environment in the respective area of the image;

determining a number of distinct face indices of the face-index map elements corresponding to a subset of the plurality of the areas of the image nearest a pixel of the image;

in response to determining that the number of distinct face indices is one, determining a depth value for the pixel via interpolation of depth values of depth map elements corresponding to the subset of the plurality of areas of the image nearest the pixel; and in response to determining that the number of distinct face indices is two or more, determining the depth value for the pixel as a distance between the image sensor and a point of the 3D polygon mesh corresponding to the pixel.

2. The method of claim 1, wherein the image has a first resolution, the depth map has a second resolution less than the first resolution, and the face-index map has the second resolution.

3. The method of claim 1, wherein the 3D polygon mesh includes a plurality of vertices respectively associated with a plurality of sets of three-dimensional coordinates in a three-dimensional coordinate system, and a plurality of faces respectively associated with a plurality of sets of the plurality of vertices.

4. The method of claim 1, wherein the projection of the 3D polygon mesh is a projection onto an image plane of the image.

5. The method of claim 4, wherein the projection of the 3D polygon mesh is based on intrinsic parameters and/or extrinsic parameters of the image sensor.

6. The method of claim 1, wherein the subset of the plurality of the areas of the image nearest the pixel has three areas of the image and determining the depth value via interpolation includes performing planar interpolation.

7. The method of claim 1, wherein the subset of the plurality of the areas of the image nearest the pixel has four areas of the image and determining the depth value via interpolation includes performing bilinear interpolation.

8. The method of claim 1, wherein each of the plurality of depth map elements includes a depth value representing a distance between the image sensor and a point on the 3D polygon mesh passing through the respective area of the image.

9. The method of claim 1, wherein determining the depth value for the pixel as the distance between the image sensor and a point of the 3D polygon mesh includes:

determining whether a ray passing from the origin through the point on the image plane intersects a first face corresponding to a first face index of the two or more distinct indices;

in response to determining that the ray intersects the first face at an intersection point, determining the distance between the origin and the intersection point; and in response to determining that the ray does not intersect the first face, determining whether a ray passing from the origin through the point on the image plane intersects a second face corresponding to a second face index of the two or more distinct indices.

10. The method of claim 1, further comprising:

transforming the image from a first perspective of the image sensor to a second perspective based on the depth value for the pixel; and displaying the transformed image.

11. The device of claim 1, wherein each of the plurality of depth map elements includes a depth value representing a distance between the image sensor and a point on the 3D polygon mesh passing through the respective area of the image.

12. The device of claim 1, wherein the one or more processors are to determine the depth value for the pixel as the distance between the image sensor and a point of the 3D polygon mesh by:

determining whether a ray passing from the origin through the point on the image plane intersects a first face corresponding to a first face index of the two or more distinct indices;

in response to determining that the ray intersects the first face at an intersection point, determining the distance between the origin and the intersection point; and in response to determining that the ray does not intersect the first face, determining whether a ray passing from the origin through the point on the image plane intersects a second face corresponding to a second face index of the two or more distinct indices.

13. A device comprising:

an image sensor;

a non-transitory memory; and one or more processors to:

capture, using the image sensor, an image of a physical environment;

obtain a depth map for the image of the physical environment, wherein the depth map includes a plurality of depth map elements respectively associated with a plurality of areas of the image and each of the plurality of depth map elements includes a depth value representing a distance between the image sensor and a point in the physical environment represented by the respective area of the image;

obtain a face-index map for the image of the physical environment, wherein the face-index map includes a plurality of face-index map elements respectively associated with the plurality of the areas of the image and each of the plurality of face-index map elements includes a list of faces of a projection of a 3D polygon mesh of the physical environment in the respective area of the image;

determine a number of distinct face indices of the face-index map elements corresponding to a subset of the plurality of the areas of the image nearest a pixel of the image;

in response to determining that the number of distinct face indices is one, determine a depth value for the pixel via interpolation of depth values of depth map elements corresponding to the subset of the plurality of areas of the image nearest the pixel; and in response to determining that the number of distinct face indices is two or more, determine the depth value for the pixel as a distance between the image sensor and a point of the 3D polygon mesh corresponding to the pixel.

14. The device of claim 13, wherein the image has a first resolution, the depth map has a second resolution less than the first resolution, and the face-index map has the second resolution.

15. The device of claim 13, wherein the 3D polygon mesh includes a plurality of vertices respectively associated with a plurality of sets of three-dimensional coordinates in a three-dimensional coordinate system, and a plurality of faces respectively associated with a plurality of sets of the plurality of vertices.

16. The device of claim 13, wherein the projection of the 3D polygon mesh is a projection onto an image plane of the image.

17. The device of claim 16, wherein the projection of the 3D polygon mesh is based on intrinsic parameters and/or extrinsic parameters of the image sensor.

18. The device of claim 13, wherein the subset of the plurality of the areas of the image nearest the pixel has three areas of the image and determining the depth value via interpolation includes performing planar interpolation.

19. The device of claim 13, wherein the subset of the plurality of the areas of the image nearest the pixel has four areas of the image and determining the depth value via interpolation includes performing bilinear interpolation.

20. A non-transitory memory storing one or more programs, which, when executed by one or more processors of a device with an image sensor cause the device to:

capture, using the image sensor, an image of a physical environment;

obtain a depth map for the image of the physical environment, wherein the depth map includes a plurality of depth map elements respectively associated with a plurality of areas of the image and each of the plurality of depth map elements includes a depth value representing a distance between the image sensor and a point in the physical environment represented by the respective area of the image;

obtain a face-index map for the image of the physical environment, wherein the face-index map includes a plurality of face-index map elements respectively associated with the plurality of the areas of the image and each of the plurality of face-index map elements includes a list of faces of a projection of a 3D polygon mesh of the physical environment in the respective area of the image;

determine a number of distinct face indices of the face-index map elements corresponding to a subset of the plurality of the areas of the image nearest a pixel of the image;

in response to determining that the number of distinct face indices is one, determine a depth value for the pixel via interpolation of depth values of depth map elements corresponding to the subset of the plurality of areas of the image nearest the pixel; and in response to determining that the number of distinct face indices is two or more, determine the depth value for the pixel as a distance between the image sensor and a point of the 3D polygon mesh corresponding to the pixel.

* * * * *